US012786115B2

(12) United States Patent
Yao

(10) Patent No.: US 12,786,115 B2
(45) Date of Patent: Nov. 3, 2026

(54) MAINTAINING STREAM EVENTS ORDER IN STREAMING SEARCH SYSTEM

(71) Applicant: Dell Products L.P., Round Rock, TX (US)

(72) Inventor: Lingling Yao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 18/656,982

(22) Filed: May 7, 2024

(65) Prior Publication Data

US 2025/0330420 A1 Oct. 23, 2025

(30) Foreign Application Priority Data

Apr. 18, 2024 (CN) ......................... 202410471741.1

(51) Int. Cl.
*H04L 45/00* (2022.01)
*H04L 47/50* (2022.01)

(52) U.S. Cl.
CPC ............ *H04L 45/566* (2013.01); *H04L 47/50* (2013.01)

(58) Field of Classification Search
None
See application file for complete search history.

(56) References Cited

U.S. PATENT DOCUMENTS

| | | | | |
|---|---|---|---|---|
| 11,184,467 | B2 * | 11/2021 | Pal | H04L 67/561 |
| 11,347,747 | B1 * | 5/2022 | Paduroiu | G06F 16/2246 |
| 2021/0149751 | A1 * | 5/2021 | Ferstay | G06F 9/4881 |
| 2022/0083228 | A1 * | 3/2022 | Ausarkar | G06F 11/2071 |
| 2022/0129468 | A1 * | 4/2022 | Su | G06F 3/067 |
| 2022/0171764 | A1 * | 6/2022 | Paduroiu | G06F 16/2246 |
| 2022/0245091 | A1 * | 8/2022 | Batsakis | G06F 16/958 |
| 2022/0245093 | A1 * | 8/2022 | Batsakis | G06F 16/144 |
| 2022/0245115 | A1 * | 8/2022 | Kulkarni | G06F 16/2428 |
| 2022/0245156 | A1 * | 8/2022 | Kulkarni | H04L 45/741 |
| 2022/0247695 | A1 * | 8/2022 | Kulkarni | G06F 16/248 |

* cited by examiner

*Primary Examiner* — Ranodhi Serrao
(74) *Attorney, Agent, or Firm* — WOMBLE BOND DICKINSON (US) LLP

(57) ABSTRACT

Methods and systems for managing data storage are disclosed. To store data, portions of data that are generated may be streamed to a storage system. The storage system may process various portions of data in parallel. To maintain ordering of some portions of the data, routing keys may be used. The routing keys may ensure that ordering between related portions of data is maintained as the portions of data are streamed and processed by the storage system.

20 Claims, 6 Drawing Sheets

MAINTAINING STREAM EVENTS ORDER IN STREAMING SEARCH SYSTEM

FIELD

Embodiments disclosed herein relate generally to device management. More particularly, embodiments disclosed herein relate to systems and methods to secure devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

SUMMARY

In an aspect, a method for managing storage of data in a streaming search system is provided. The method may include obtaining a payload for storage; identifying a routing key for the payload; adding the payload to a data stream of multiple data streams serviced by index workers; once the payload has reached a head of the stream, routing the payload from the data stream to a queue of a first set of queues based on the routing key; once the payload has reached a head of the queue of the first set of queues, partially processing the payload by an indexing thread associated with the queue to add the partially processed payload to a queue of a second set of queues based on the routing key; and once the partially processed payload has reached a head of the queue of the second set of queues, updating a shard associated with the queue of the second set of queues.

The streaming search system may include a plurality of shards comprising the shard, and the streaming search system may be configured to provide search results using the plurality of shards.

The routing key may be added along with the payload to the data stream.

The data stream may include payloads from endpoint devices that are to be stored in a searchable format.

The payload may include data having a temporal ordering with data from other payloads in the data stream.

The payload may be added to the data stream based on the routing key, and other payloads that are also associated with the routing key may be added to the data stream to ensure that temporal ordering between the payload and the other payloads is maintained in the data stream.

The method may also include, after adding the payload to the data stream: adding a checkpoint to the stream.

The shard may be associated with the routing key, and all payloads associated with the routing key may be used to update the shard to retain temporal ordering between the payloads.

Each of the payloads may be associated with a corresponding event for a data structure, and each of the payloads may be usable to update the data structure so long as each of the payloads is used in a same temporal order of the corresponding events.

Updating the shard may include processing, by a first entity that exclusively manages the shard, the payload from the queue of the second set of queues.

Routing the payload may include hashing the routing key to make an identification of the queue of the first set of queues; and adding the payload to the queue of the first set of queues based on the identification of the queue.

The method may also include after updating the shard: updating a cache for the shard to indicate that the payload from the queue of the second set of queues has been processed.

Updating the shard may include making a determination regarding whether the shard has been updated based on the payload using the cache; and in a first instance of the determination where the shard has not been updated based on the payload: adding information to the shard to update the shard; in a second instance of the determination where the payload has been updated based on the shard: retaining existing content of the shard to update the shard.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance of the computer-implemented method when the computer instructions are executed by the processor.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "in an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data. To store the data, the data may be streamed to a storage system. The storage system may store the data for future use.

To improve throughput, the data may be streamed to the storage system in parallel. Different threads may be used to processes data from different streams. Corresponding queues and threads may be used to further process the data in parallel.

To maintain ordering of the data as it is processed, routing keys may be used. The routing keys may be used to ensure that related portions of data is processed sequentially and in an order corresponding to the temporal order in which the portions of data arose. For example, the portions of data may reflect changes to a data structure over time. If the changes are applied out of order, the resulting updated data structure may differ from that expected based on the updates. The routing keys may ensure that ordering between portions of data is maintained as related portions of data traverse a storage architecture.

Thus, embodiments disclosed herein may address, among others, the technical problem of data storage in distributed systems. By maintaining data ordering even while some parallel processing is performed, the quality of stored data may be improved.

Figure 1:
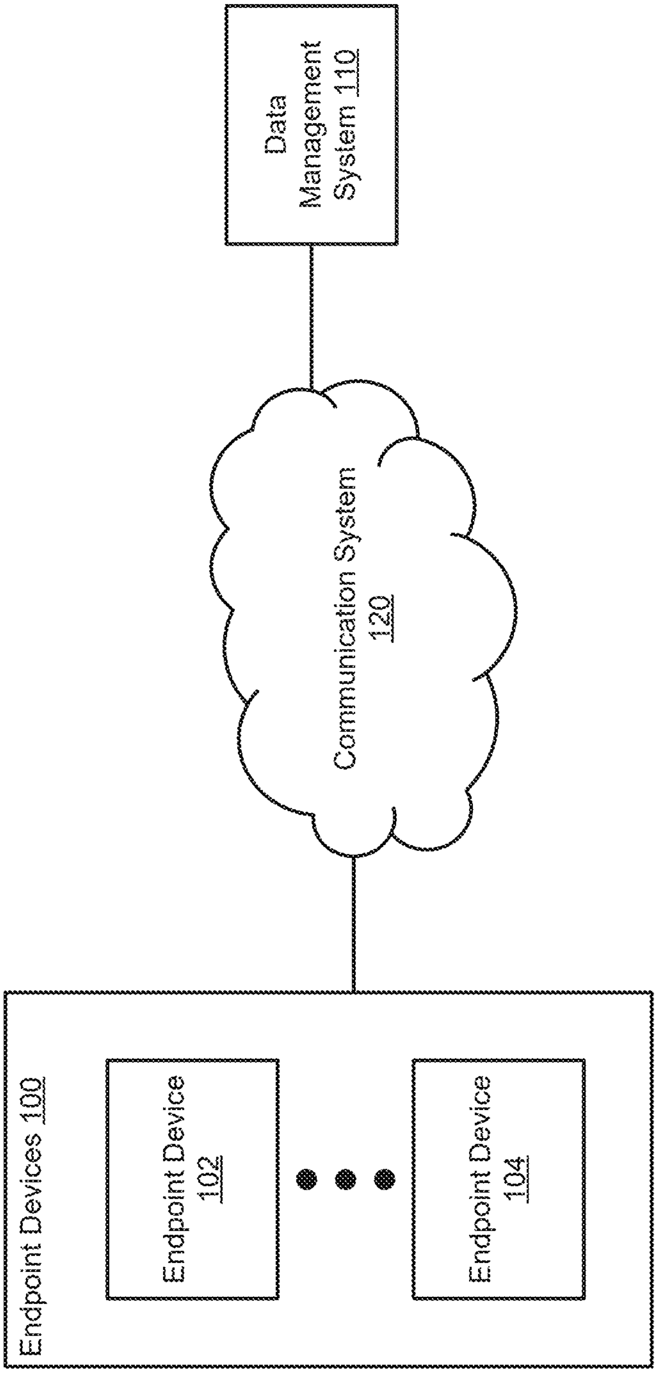
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, transaction processing services, and/or any other type of service that may be implemented with a computing device.

While computer implemented services are provided, information may be generated and stored. The stored information may be used for a variety of purposes. For example, the information can be used to guide operation of various systems, update the operation of systems, modify data collection processes to improve the likelihood of having access to desired information in the future, etc.

The information may be collected from any number of sources (e.g., endpoint devices 100), and may include any quantity and type of information. To facilitate use of the information in the future, the information may be indexed and/or otherwise placed in a searchable format.

However, to search for desired information, the stored data in which information is encoded may need to accurately represent the information that was originally obtained. If the stored data does not provide access to data that faithfully encodes the information, then searches of the data may not provide the desired information.

Additionally, if the rate of information that is created exceeds the ability of storage systems to process the information for storage, then the stored data may be dated or otherwise not include representations of the information that are current. If searches of such information are performed, then the returned results may not include the most relevant information even though the most relevant information already exists.

In general, embodiments disclosed herein may provide methods, systems, and/or devices for improving the likelihood of providing access to information in the future. To improve the likelihood of providing access to information, a streaming storage system may be provided that both (i) maintains temporal ordering of information during processing of the information, and (ii) enables parallel processing of the information to ensure that the information is processed timely.

To maintain the temporal ordering of information, the stream storage system may use routing keys. A routing key may be a data structure (e.g., an identifier) used to route information through the stream storage system. The routing key may be used to ensure that different payloads that are temporally related to each other (e.g., each payload being associated with a different event for a same data structure) are processed in an order corresponding to the temporal ordering. For example, the routing keys may be used to ensure that related payloads are added to the same data streams (e.g., more specifically, by adding the payloads to stream segments of a stream) and/or queues so that the payloads are not processed in an order that differs from the temporal order of the payloads.

For example, if a user modifies a file three times and three different points in times, three different payloads may be generated. The stream storage system may use a same routing key for all three payloads so that the three payloads are processed in a same order in which the payloads are created.

To enable parallel processing of the information, the stream storage system may utilize multiple data stream segments (may also use multiple data streams which may individually include multiple stream segments), data queues, and data processing threads. To maintain the ordering of the payloads within these components of the stream storage system, the routing keys may be used to route the payloads through these components. For example, when initially created, each payload may be assigned routing keys corresponding to the data structure to which each payload is associated (e.g., a payload may be an update to a data structure or may be a new data structure). By assigning the same routing key to the payloads associated with the same data structure, the ordering of the payloads may be maintained as the payloads traverse the components of the stream storage system.

To provide the above noted functionality, the system of FIG. 1 may include endpoint devices 100, data management system 110, and communication system 120. Each of these components is discussed below.

Endpoint devices 100 may provide desired computer implemented services, as discussed above. The performance of these services may result in the creation of information to which access in the future is desired. To facilitate access to the information, data in which the information is encoded may be stored in data management system 110. To store the data in data management system 110, endpoint devices 100 may generate payloads in which changes to existing and/or new data structures are stored.

Once stored with data management system 110, the information may be searched using various search algorithms. For example, endpoint devices 100 and/or other devices (not shown) may submit queries and receives results based on the stored data in data management system 110. Any number of endpoint devices (e.g., 102-104) may contribute information to and/or use information from data management system 110.

Data management system 110 may provide data storage services. To provide the data storage services, data management system 110 may (i) obtain data packages from endpoint devices 100, (ii) index the data packages, and (iii) update repositories (e.g., shards) in which information based on the data packages is stored. To facilitate high data storage throughput, the data management system 110 may parallelize operations, and use routing keys to maintain ordering of data packages during processing. By doing so, large volumes of data may be processed while ensuring that the data is processed in corresponding orders.

Figure 2A:
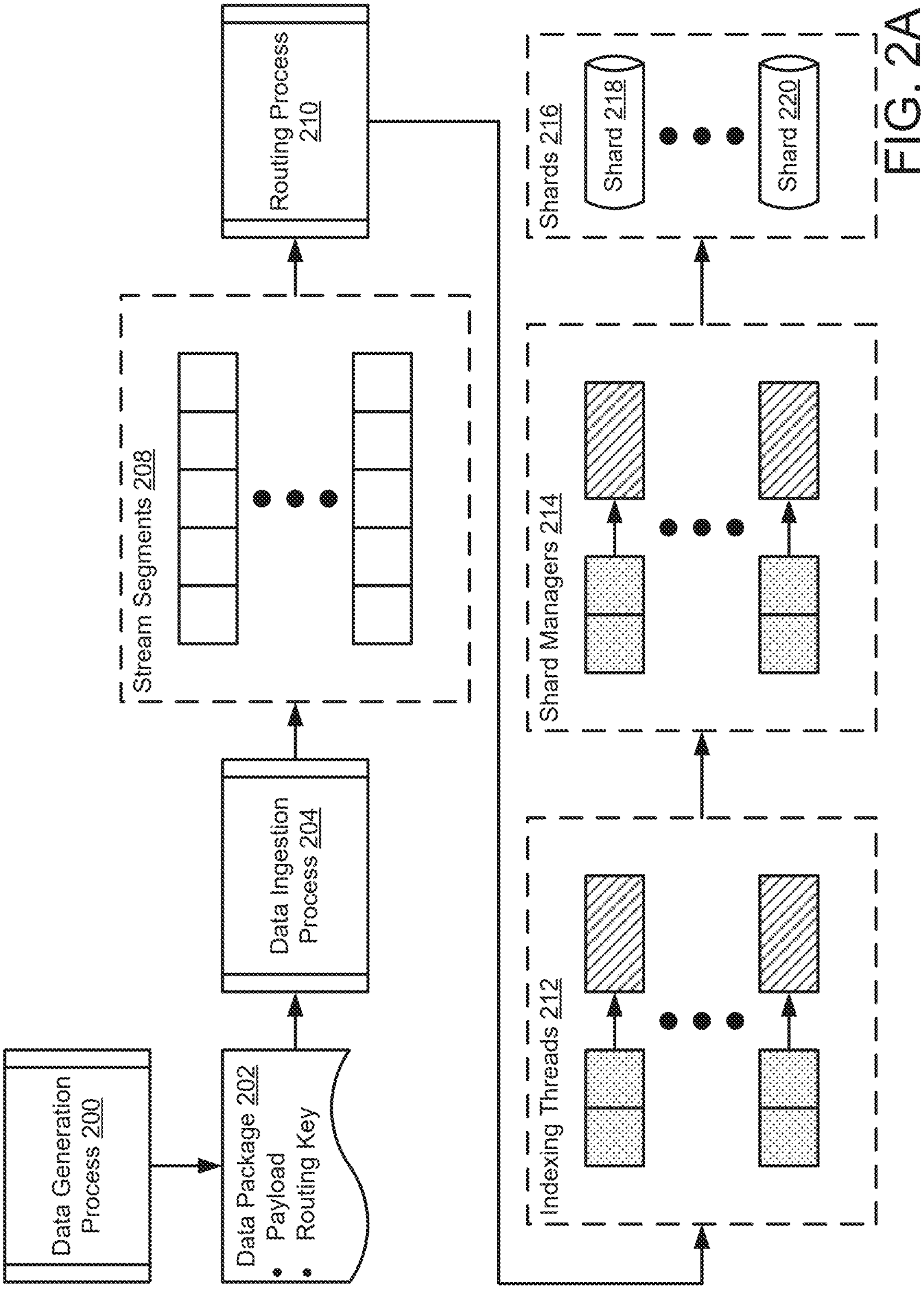
FIGS. 2A-2C show data flow diagrams in accordance with an embodiment.
Figure 2B:
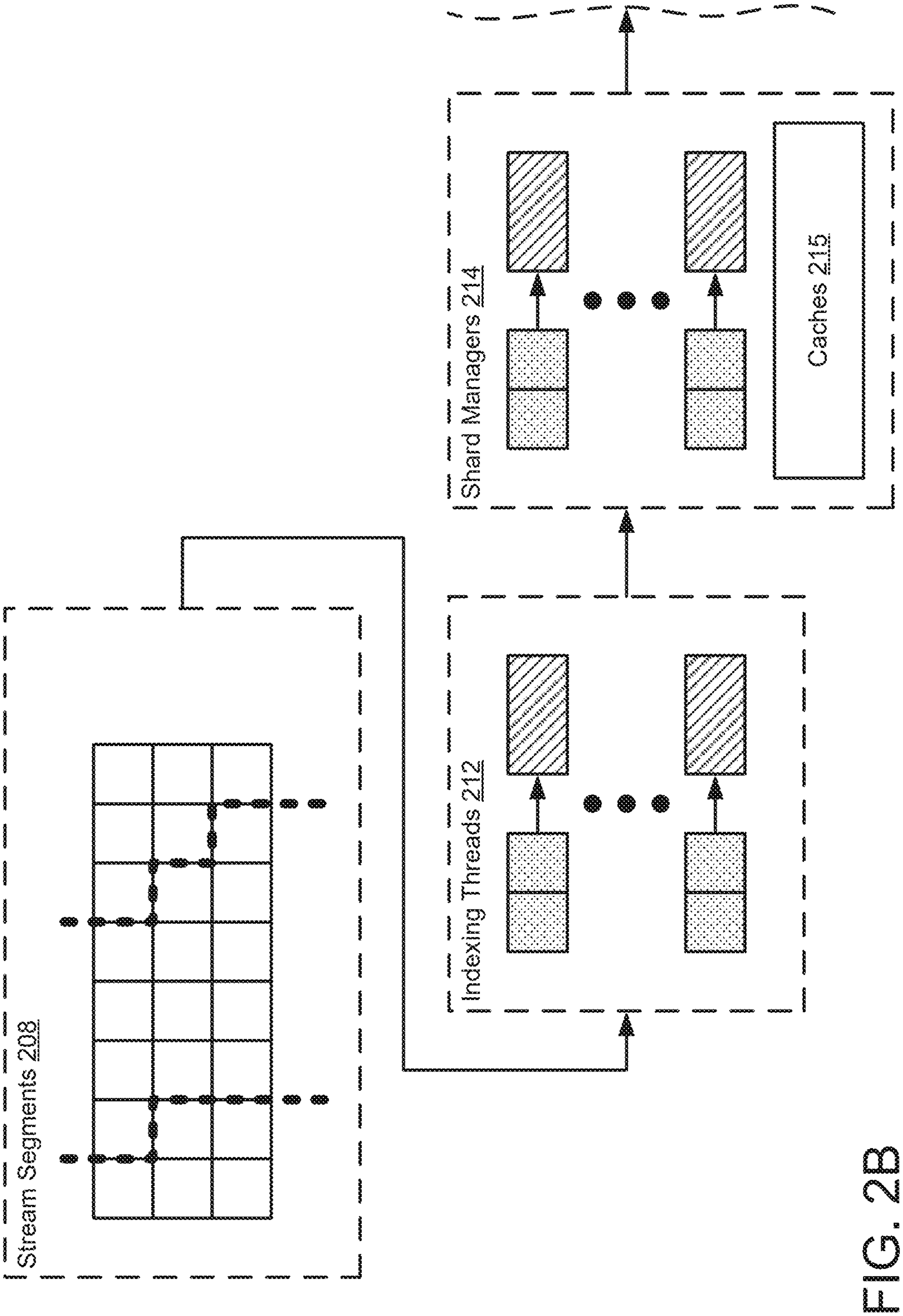
Figure 2C:
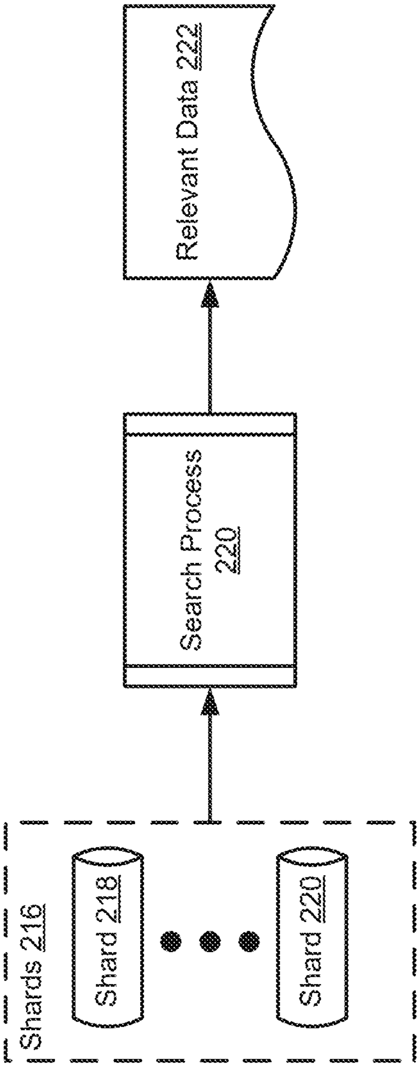
Figure 3:
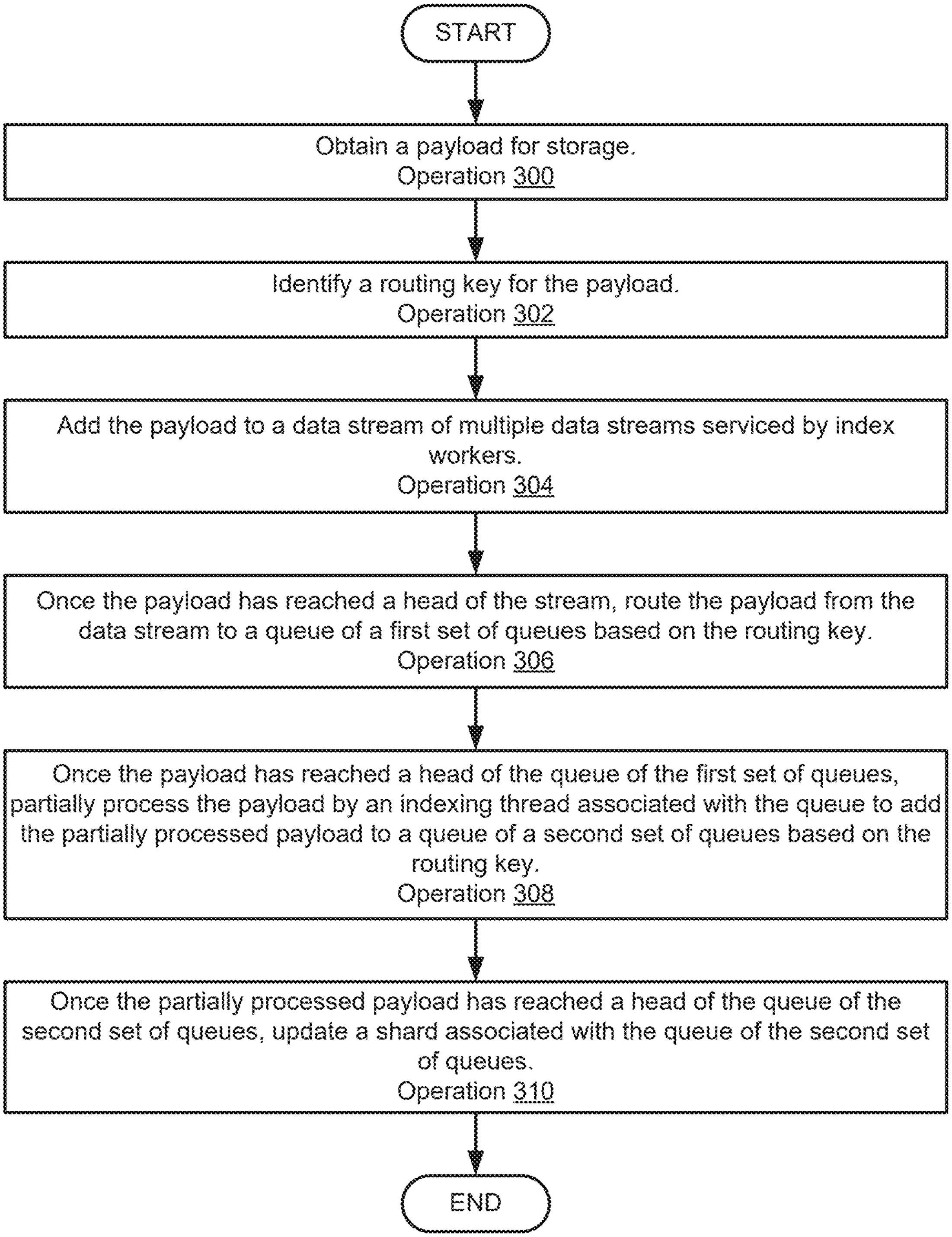
FIG. 3 shows a flow diagram illustrating a method in accordance with an embodiment.

When providing their functionality, any of (and/or components thereof) endpoint devices 100 and data management system 110 may perform all, or a portion, of the actions and methods illustrated in FIGS. 2A-3.

Any of (and/or components thereof) endpoint devices 100 and data management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, data management system 110 includes multiple computing devices. Different computing devices of data management system 110 may perform various portions of the functionality of data management system 110, discussed above. For example, various shards (e.g., data repositories) in which data is stored may be distributed across different computing devices.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 202, etc.) is used to represent data structures, a second set of shapes (e.g., 204, 210, etc.) is used to represent processes performed using and/or that generate data, and a third set of shapes (e.g., 218, 220, etc.) is used to represent large scale data structures such as databases. Other shapes represent data streaming processes (e.g., 208), data indexing processes (e.g., 212), and data storage processes (e.g., 214).

Turning to FIG. 2A, a first data flow diagram in accordance with an embodiment is shown. The first data flow diagram may illustrate data used in and data processing performed in streaming data for storage and search.

To prepare data for storage and search, various data generation processes (e.g., 200) may be performed. The data generation processes may be processes performed by endpoint devices that generate data. The processes may include, for example, sensor reading processes, data structure (e.g., files) modification processes, generation processes, and/or other processes through which data may be generated. As the data generation processes are performed, various events may occur that indicate that data should be stored for future searching.

To stream the data to a shard for eventual storage, the data (e.g., a payload) may be stored as part of a data package (e.g., 202). The data package may include the payload, and a routing key for the data.

A routing key may be a piece of data used to route the payload for eventual processing with a shard. Different data structures may be associated with different routing keys. For example, when a data structure is initially created and stored in a shard, the data structure may be associated with a routing key that is associated with the shard in which the data structure is initially stored. Each shard may be associated with a different routing keys. The routing keys may be distributed to the devices that perform the data generation processes, and/or other devices so that the routing keys may be added to the data packages.

Once a data package is created (e.g., 202), the data package may be streamed to a corresponding shard. To stream the data package, data ingestion process 204 may be performed. During data ingestion process 204, the routing keys of data packages may be used to select a corresponding data stream segment in which to add the data package 202.

There may be any number of data stream segments (e.g., stream segments 208) to which the data package may be added. The routing key may be used to ensure that modifications to a particular data structure stored in a shard are all added to a same stream segment. In this manner, different updates for the same data structure stored in a shard may be kept in an order in which the data structures are created. For example, various events may give rise to different updates, and corresponding data packages. Thus, the corresponding data packages may be added to the same stream to ensure that the data packages are processed in a same order as the events that give rise to the updates. As will be discussed below, subsequent processes may similarly use the routing keys to ensure that related data packages are retained in similar streams and queues to maintain ordering during processing.

Stream segments 208 may represent various data streaming processes (e.g., may be carried across network segments, may be temporarily stored/cached, various computing devices may support the data transport, etc.). When data is added to a stream segment, the data may be sequentially processed on a first in, first out basis. Stream segments 208 may include any number of different stream segments. Each stream segment may be associated with any number of routing keys. The routing key-stream segment associations may be established on any basis (e.g., for load balancing). Once established, the associations may be maintained to ensure that related data packages are added to the same stream segment (e.g., and queue, as will be discussed below).

To process data packages from stream segments 208, routing process 210 may be performed. Routing process 210 may be performed, for example, by various readers (e.g., a reader group) that read data packages from the corresponding stream segments. The readers may add check points to the stream segments to facilitate recovery should components of storage system crash or otherwise become temporarily/permanently inoperable, and may read data packages from the streams. Refer to FIG. 2B for additional details regarding adding and use of checkpoints in the stream segments.

When a data package is read from a stream by a reader, the reader may add the data package to a queue for an indexing process. For example, indexing threads 212 may include any number of threads that index data packages from corresponding queues. Indexing threads 212 may include any number of queues (e.g., illustrated by the blocks with dotted infill), and corresponding threads (e.g., illustrated by the blocks with lined infill, with arrows indicating that the threads pull packages from the corresponding queues). Consequently, multiple data packages from various queues may be correspondingly indexed.

The specific queue to which each data package from a stream is added may be based on the routing key associated with that data package. For example, the routing key of each data package may be hashed, and the resulting hash value may be used to select to which queue to add the data package. Consequently, all data packages having a same routing key may be added to the same queue of indexing threads 212. Accordingly, the data packages may be maintained in the same order in which they were generated in these queues as well.

The thread corresponding to each queue of indexing threads 212, may pre-process the payload for subsequent use. For example, the payload may be packaged into a predetermined format, some metadata regarding the payload may be generated, and/or other processing operations may be performed.

Once processed, the resulting processed data may be added to a queue for a storage process. For example, shard managers 214 may include any number of threads (e.g., workers) that manage updating of shards based on data included in a corresponding queue. By queuing the processed data in a given queue, the processed data may eventually be used to update a corresponding shard. The queue to which the processed data is added may be based on the routing key, much like the queue of indexing threads 212 to which the data package was added. In this manner, related processed data (e.g., for events for a same data structure) may all be used to update a same shard. In this manner, the order in which the processed data is used to update the shard may be the same as the order in which corresponding events for a same data structure occurred. Thus, temporal ordering may be maintained while data processing parallelization is performed.

Shard managers 214 may include any number of queues (e.g., illustrated by the blocks with dotted infill), and corresponding threads (e.g., illustrated by the blocks with lined infill, with arrows indicating that the threads pull packages from the corresponding queues). Consequently, processed data from various queues may be correspondingly stored in different shards. For example, the thread associated with a queue may be the manager for a corresponding shard (e.g., 218, 220) of shards 216. Thus, only data from the corresponding queue may be used to update each shard.

However, as data is being processed by indexing threads 212 and/or shard managers 214, any of these processes may crash or otherwise enter undesired operating states that prevent continued processing of data from stream segments 208. To facilitate recovery from such crashes or other undesired operating states, the data may be segmented.

Turning to FIG. 2B, a second data flow diagram in accordance with an embodiment is shown. The second data flow diagram may illustrate data used in and data processing performed in stream segmenting and recovery.

To segment and prepare for stream recoveries, recovery check points may be added to each stream segment of stream segments 208. In FIG. 2B, these check points are illustrated using the oversized dashed lines layered on top of three example stream segments. When data packages are read from a stream segment, the data packages may not be discarded until it is confirmed that corresponding processed data has been used to update a corresponding shard. For example, the routing processes that manages data from the stream segments may read and send data in between two checkpoints, which may be referred to as cp-1 and cp-2. However, the routing process may not remove the data packages from the stream until the routing process confirms (e.g., with shard managers 214) that the corresponding processed data has been used to update corresponding shards. In other words, the processed data has been committed to a shard.

If successfully committed, then the routing process may remove the senior checkpoint (e.g., cp-2 in this example) and data packages from the stream, and repeat the process using two more junior checkpoints (e.g., cp-1 and a newly designated checkpoint).

If not successfully committed due to, for example, (i) failure of an indexing thread, (ii) failure of a shard manager, (iii) a load balancing process (e.g., shard manager re-tasked to manage different shards), and/or other reasons, then a recovery process may be performed.

When an indexing thread fails, the data packages for that thread may be re-read from the corresponding stream segment and added to a corresponding queue once the failed indexing thread is replaced.

When a shard worker fails or a shard is migrated to a different shard manager, (i) a last completed checkpoint may be identified, (ii) the data packages that have not been processed based on the checkpoint may be re-read from stream segments 208, and (ii) the routing process may be reset so that not-yet processed data is read from the stream segments. Thus, the streaming storage system may re-process all of the data packages between two checkpoints.

However, some of the data packages between these two checkpoint may have already been used to update a corresponding shard. To deduplicate the data used to update the shards, caches 215 for the shard managers may be maintained. These caches may cache processed data that has been used to update a shard. The caches may be reset whenever all of the data between two checkpoints is confirmed as having been used to update (e.g., added to, used to modify, etc.) a shard. Thus, caches 215 may only include processed data corresponding to data packages from stream segments 208 that have been used to update a shard but is still being retained between all of the data packages between two checkpoints have yet to be processed.

In addition to the processed data, key-values may be stored with the processed data. The key-values may associate the processed data with corresponding data packages in the stream segments and data structure identifier from a shard. When a shard manager receives processed data repeatedly (e.g., due to multiple failures), the shard manager may query the cache first, and the cache gets hit and then shard manager compares the position of the data package and the position from the cache. If the position is smaller than the position from the cache, then it may be concluded that the data package is aged and returns directly. However, if the processed data relates to a new data structure that is not yet stored in a shard, then the cache will not include a corresponding entity. If no corresponding data structure exists, then the processed data may be indexed and then added to the cache. Otherwise, the data package corresponding to the processed data may not be indexed and added to the shard to prevent pollution of the shard with duplicative data.

In contrast, other micro-service components in the data process path such as indexing threads may just ensure that every data package before a specific checkpoint is sent down the stream before moving past the checkpoint.

Thus, via the flows shown in FIGS. 2A-2B, embodiments disclosed herein may facilitate streaming storage of data in a format usable for search.

Turning to FIG. 2C, a third data flow diagram in accordance with an embodiment is shown. The third data flow diagram may illustrate data used in and data processing performed in searching of stored data.

To search stored data, search process 220 may be performed. During search process 220, the data stored in shards 216 may be queried to identify relevant data 222. The shards may be searched using any method to identify various portions of data that may be relevant to a query. The query may be defined, for example, by a separate process, a user, and/or via other methods.

Once obtained, relevant data 222 may be returned and used to provide computer implemented services.

Because of the new streaming data and storage architecture used to store data in shards 216, relevant data 222 may be more likely to meet a requestor's goal for the query. For example, by maintaining temporal ordering of processed data used to update shards 216 and parallelization, the content of shards 216 may be up to date and more likely to reflect the information obtained by the endpoint devices that stream data for storage with shards 216.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage storage of data. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

At operation 300, a payload for storage is obtained. The payload may be obtained by reading the payload from a local storage, obtaining the payload from another devices, by generating the payload, and/or via other methods. The payload may be associated with a data structure stored in a shard of a streaming storage system. For example, the payload may be an update (e.g., a change to) to the data structure. The data structure may be a document or other type of delineated portion of data.

At operation 302, a routing key for the payload is identified. The routing key may be identified based on an association between the payload and a data structure stored in a shard of a streaming storage system. The shard in which the data structure is stored may be associated with the routing key. The routing key may be identified based on these associations. For example, when a shard is created, a corresponding routing key may be established.

At operation 304, the payload is added to a data stream of multiple data streams (e.g., stream segments). The data streams may be serviced by index workers (e.g., indexing threads). The payload may be added by (i) identifying a data stream based on the routing key, (ii) adding the payload to a data package, and (iii) adding the data package to the identified data stream. The data stream may be identified by hashing the routing key. The resulting hash value may be associated with one of the data streams, which may then be identified accordingly.

At operation 306, once the payload has reached a head of the stream, the payload may be routed from the data stream to a queue of a first set of queues based on the routing key. The first set of queues may be associated with indexing threads. The routing key may be used to select to which queue the payload is added. The selection may be on any basis (e.g., hashing or other function).

As payloads are routed, various checkpoint may be added to the stream (and/or other streams). The payloads read from the stream may not be discarded until it is confirmed that all of the payloads between two checkpoints in the streams have completed processing (e.g., used to update a shard). The checkpoints may be added using any algorithm.

At operation 308, once the payload has reached a head of the queue of the first set of queues, the payload may be partially processed by an indexing thread associated with the queue to add the partially processed payload to a queue of a second set of queues based on the routing key. The payload may be partially processed, as noted above, by indexing and/or generating other types of metadata. The metadata and payload may then be added to the queue of the second set of queues as the partially processed payload.

The queue of the second set of queues may be selected via any method, so long as the selection is substantially consistent. In other words, the partially processed payloads that originate from a queue of the first set of queues are generally added to a corresponding queue of the second set of queues. Doing so may maintain temporal consistency of processing the data packages, payloads, partially processed payloads, etc.

At operation 310, once the partially processed payload has reached the head of the queue of the second set of queues, a shard associated with the queue of the second set of queues may be updated. The shard may be updated by adding the partially processed payload to the shard, modifying stored data in the shard, and/or via other methods.

As the partially processed payload is used to update the shard, information regarding the partially processed payload may be added to a cache. The information may be key-values usable to ascertain, in the future, whether the partially processed data has been used to update the shard, corresponding data packages in the stream segments, and data structures stored in the shard.

The aforementioned information may be used to restart processing of data from the streaming storage system. For example, the data packages between checkpoints in the stream may not be discarded until it is verified that the downstream artifacts based on the data packages have been used to update the shard.

The method may end following operation 310.

Once and/or as data is stored in the shards, the shards may be used to provide relevant data through servicing of queries. By virtue of the data storage process for the shards, the content of the shards may be more up to date, and more likely to include accurate information. Thus, the resulting search results may be more desirable to users. Accordingly, a streaming storage system in according with embodiments disclosed herein may use an improved storage architecture that results in the production of high quality results (e.g., search, general information retrieval, etc.).

The shards may include, for example, various indexes that use terms as keys and return data structures (e.g., documents) as relevant results when the keys are used to search the indexes. For example, the data may be structured as a log-structured merge-tree.

Figure 4:
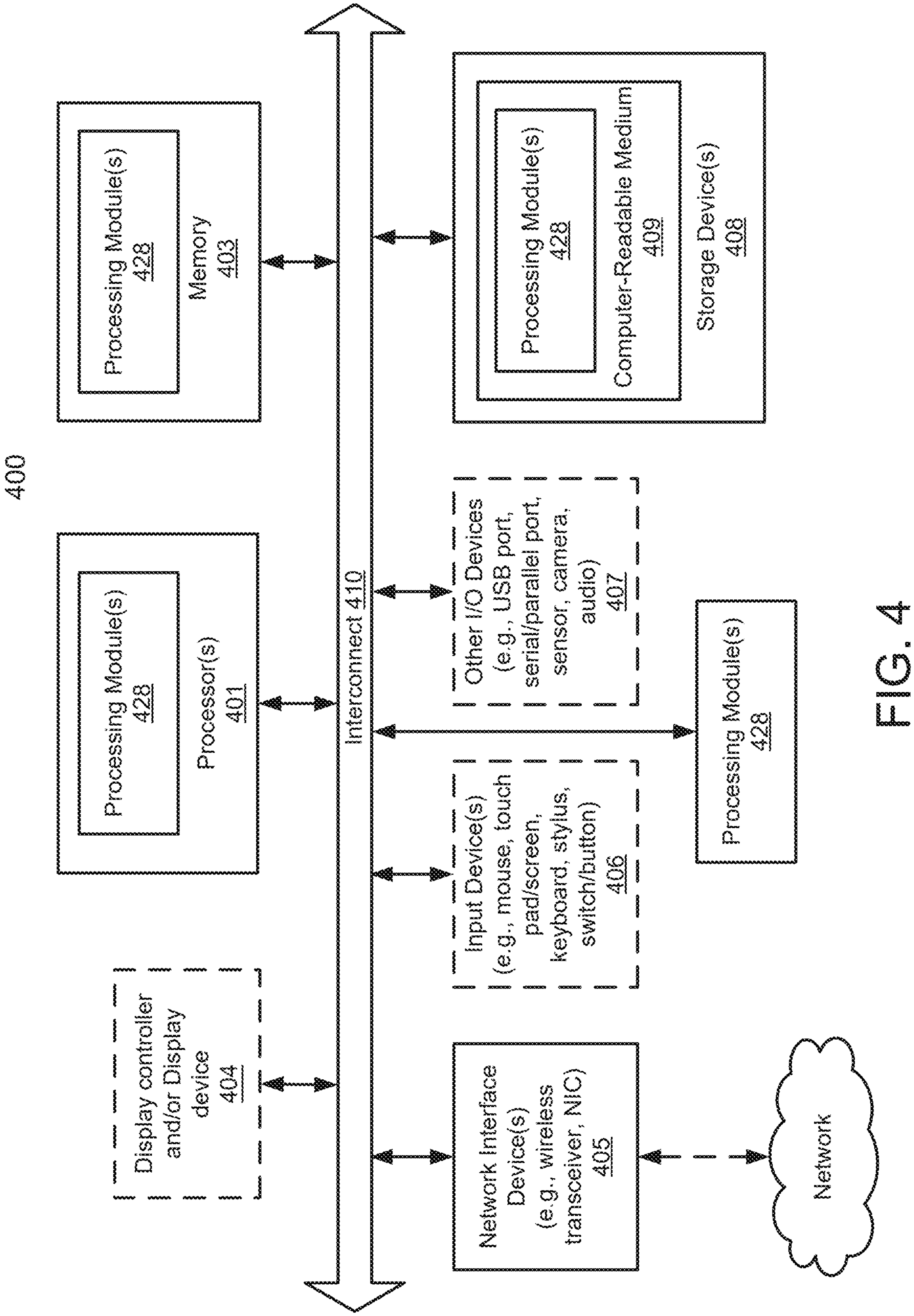
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both.

Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing storage of data in a streaming search system, the method comprising:

obtaining a payload for storage;

identifying a routing key for the payload;

adding the payload to a data stream of multiple data streams serviced by index workers, wherein the payload is added to the data stream based on the routing key, and other payloads that are also associated with the routing key are added to the data stream to ensure that a temporal ordering between the payload and the other payloads is maintained in the data stream, wherein a first checkpoint is added to the data stream before the payload and a second checkpoint is added to the data stream after the payload;

once the payload has reached a head of the data stream, routing the payload from the data stream to a queue of a first set of queues based on the routing key;

once the payload has reached a head of the queue of the first set of queues, partially processing the payload by an indexing thread associated with the queue of the first set of queues to add the payload that is partially processed to a queue of a second set of queues based on the routing key, wherein the queue of the second set of queues and a shard of the streaming search system are associated with the routing key; and once the payload that is partially processed has reached a head of the queue of the second set of queues, updating the shard while ensuring the temporal ordering between the payload and the other payloads, wherein, to ensure that the temporal ordering is maintained, the payload cannot be discarded from the data stream until it is confirmed that all data packages between the first checkpoint and the second checkpoint have been used to update the shard.

2. The method of claim 1, wherein the streaming search system comprises a plurality of shards, the shard being one of the plurality of shards, and the streaming search system is configured to provide search results using the plurality of shards.

3. The method of claim 1, wherein the routing key is added along with the payload to the data stream.

4. The method of claim 1, wherein the data stream comprises payloads from endpoint devices that are to be stored in a searchable format.

5. The method of claim 1, wherein the payload and each of the other payloads are associated with corresponding events for a data structure, and the payload and each of the other payloads are usable to update the data structure so long as the payload and each of the other payloads are used in a same temporal order of the corresponding events for the data structure.

6. The method of claim 1, wherein updating the shard comprises:

processing, by a first entity that exclusively manages the shard, the payload from the queue of the second set of queues.

7. The method of claim 6, wherein routing the payload comprises:

hashing the routing key to make an identification of the queue of the first set of queues; and adding the payload to the queue of the first set of queues based on the identification of the queue.

8. The method of claim 1, further comprising:

after updating the shard:

updating a cache for the shard to indicate that the payload from the queue of the second set of queues has been processed.

9. The method of claim 8, wherein updating the shard comprises:

making a determination regarding whether the shard has been updated based on the payload using the cache;

in a first instance of the determination where the shard has not been updated based on the payload:

adding information to the shard to update the shard; and in a second instance of the determination where the shard has been updated based on the payload:

retaining existing content of the shard to update the shard.

10. The method of claim 8, wherein, in response to a failure of an indexing thread managing the queue of the first set of queues before the second checkpoint is processed, the payload in the queue of the first set of queues is re-read from a segment of the data stream between the first checkpoint and the second checkpoint.

11. The method of claim 10, wherein, in response to a failure of a shard manager managing the shard associated with the second set of queues before the second checkpoint is processed, the payload is re-read from the segment of the data stream between the first checkpoint and the second checkpoint.

12. The method of claim 11, wherein, to deduplicate updated data in the shard, the cache is referenced to identify a portion of the payload used to update the shard prior to the failure of the shard manager.

13. The method of claim 1, wherein, after updating the shard, the second checkpoint is discarded and a newly designated checkpoint is associated with the first checkpoint to maintain the temporal ordering.

14. A non-transitory machine-readable medium having instructions stored therein, which when executed by a processor, cause the processor to perform operations for managing storage of data in a streaming search system, the operations comprising:

obtaining a payload for storage;

identifying a routing key for the payload;

adding the payload to a data stream of multiple data streams serviced by index workers, wherein the payload is added to the data stream based on the routing key, and other payloads that are also associated with the routing key are added to the data stream to ensure that a temporal ordering between the payload and the other payloads is maintained in the data stream, wherein a first checkpoint is added before to the data stream before the payload and a second checkpoint is added to the data stream after the payload;

once the payload has reached a head of the data stream, routing the payload from the data stream to a queue of a first set of queues based on the routing key;

once the payload has reached a head of the queue of the first set of queues, partially processing the payload by an indexing thread associated with the queue of the first set of queues to add the payload that is partially processed to a queue of a second set of queues based on the routing key, wherein the queue of the second set of queues and a shard of the streaming search system are associated with the routing key; and once the payload that is partially processed has reached a head of the queue of the second set of queues, updating the shard while ensuring the temporal ordering between the payload and the other payloads, wherein, to ensure that the temporal ordering is maintained, the payload cannot be discarded from the data stream until it is confirmed that all data packages between the first checkpoint and the second checkpoint have been used to update the shard.

15. The non-transitory machine-readable medium of claim 14, wherein the streaming search system comprises a plurality of shards, the shard being one of the plurality of shards, and the streaming search system is configured to provide search results using the plurality of shards.

16. The non-transitory machine-readable medium of claim 14, wherein the routing key is added along with the payload to the data stream.

17. The non-transitory machine-readable medium of claim 14, wherein the data stream comprises payloads from endpoint devices that are to be stored in a searchable format.

18. A system, comprising:

a processor; and a memory coupled to the processor to store instructions, which when executed by the processor, cause the system to perform operations for managing storage of data in a streaming search system, the operations comprising:

obtaining a payload for storage;

identifying a routing key for the payload;

adding the payload to a data stream of multiple data streams serviced by index workers, wherein the payload is added to the data stream based on the routing key, and other payloads that are also associated with the routing key are added to the data stream to ensure that a temporal ordering between the payload and the other payloads is maintained in the data stream, wherein a first checkpoint is added to the data stream before the payload and a second checkpoint is added to the data stream after the payload;

once the payload has reached a head of the data stream, routing the payload from the data stream to a queue of a first set of queues based on the routing key;

once the payload has reached a head of the queue of the first set of queues, partially processing the payload by an indexing thread associated with the queue of the first set of queues to add the payload that is partially processed to a queue of a second set of queues based on the routing key, wherein the queue of the second set of queues and a shard of the streaming search system are associated with the routing key; and once the payload that is partially processed has reached a head of the queue of the second set of queues, updating the shard while ensuring the temporal ordering between the payload and the other payloads, wherein, to ensure that the temporal ordering is maintained, the payload cannot be discarded from the data stream until it is confirmed that all data packages between the first checkpoint and the second checkpoint have been used to update the shard.

19. The system of claim 18, wherein the streaming search system comprises a plurality of shards, the shard being one of the plurality of shards, and the streaming search system is configured to provide search results using the plurality of shards.

20. The system of claim 18, wherein the routing key is added along with the payload to the data stream.

* * * * *